United States Patent [19]

Parker

[11] Patent Number: 5,005,526
[45] Date of Patent: Apr. 9, 1991

[54] COLLAPSIBLE VEHICLE SAFETY APPARATUS FOR ANIMALS

[76] Inventor: Charles Parker, 9953 Blossom Valley Rd., El Cajon, Calif. 92021

[21] Appl. No.: 582,408

[22] Filed: Sep. 14, 1990

[51] Int. Cl.$^5$ .......................................... A01K 29/00
[52] U.S. Cl. ..................................... 119/96; 297/250; 297/256
[58] Field of Search .................. 119/96, 101; 297/250, 297/255, 256, 487, 488

[56] References Cited

U.S. PATENT DOCUMENTS

| | | | |
|---|---|---|---|
| 834,383 | 10/1906 | Johnson | 297/255 |
| 1,351,746 | 9/1920 | Eberle | |
| 2,508,822 | 5/1950 | Goldberg | 5/94 |
| 2,690,790 | 10/1954 | Linden | 297/255 |
| 3,310,034 | 3/1967 | Dishert | 119/96 |
| 3,669,492 | 6/1972 | Peterson | 297/256 |
| 3,762,768 | 10/1973 | Hyde et al. | 297/256 |
| 3,791,694 | 2/1974 | Roberts et al. | 297/250 |
| 4,010,830 | 3/1977 | Guillot-Munoz | 119/96 |
| 4,512,286 | 4/1985 | Rud | 119/96 |

*Primary Examiner*—Paul J. Hirsch
*Attorney, Agent, or Firm*—Andsel Group, Inc.

[57] ABSTRACT

A collapsible vehicle safety apparatus for animals, in combination with a vehicle, is described that has a rigid base and a collapsible support frame removably secured to the base. There are at least two blind insertion holes, in the base, to releasingly accept and retain a first leg and a second leg of the frame. A pliable barrier cover is attached to the frame. A padded top restraint means, is attached to the cover, to reduce trauma from impact due to abrupt forward movemenmt of the animal. There is an adjustable harness, attached to the frame, to restrict movement of the animal. There is a first seat belt attachment means, in the cover, to attach a vehicular seat belt to secure the frame and cover to the vehicle. A second seat belt attachment means, is attached to the cover, to secure the frame and the cover to the vehicle. Either belt attachment means may be used at the discretion of the user. There is an insertion port in the cover and a removable soil tray slidingly inserted through the insertion port, over and in intimate contact with the base.

5 Claims, 1 Drawing Sheet

COLLAPSIBLE VEHICLE SAFETY APPARATUS FOR ANIMALS

BACKGROUND OF THE INVENTION

1. Field of the Invention

This invention relates to a restraining apparatus for transporting animals in vehicles.

2. Description of the Related Art

There are millions of pet owners in the country. Often pet owners like to take their pets along with them in their vehicle. The driver and the human passengers have seat belts which protect them if an emergency arises. The animals often do not. In a sudden stop or during an accident, the pet is often injured or thrown into the driver causing further problems in an already difficult situation.

In the past, two approaches to restraining animals in vehicles have been offered. One is a harness that is useful on large animals and the other is a basketlike carrier for smaller animals.

U.S. Pat. No. 3,310,034 to H. S. Dishart on Mar. 21, 1967 shows a safety harness and collar arrangement. One of the disadvantages of this device is that it allows the animal to sit directly on the vehicle seat leaving the seat open to damage by soiling and scratching.

U.S. Pat. No. 4,010,880 to M. Guillot-Munoz on Mar. 08, 1977 describes a bag-like container that hooks over the seat and has a restraining rope to keep the animal in the basket.

U.S. Pat. No. 4,512,286 to P. R. Rux on Apr. 23, 1985 shows a container to support a pet and has a hinged front panel. There is a mounting bracket that fits over the seat back to mount the container to the seat. The configuration of the bracket limits the type of vehicle used and would tend to be damaging to the seat back.

U.S. Pat. No. 4,597,359 to M. D. Moorman on July 1, 1986 describes a Platform and safety harness placed on a tubular steel base member that rests like a chair base on the vehicle seat. It contains a removable watering cup.

SUMMARY OF THE INVENTION

This invention provides for a safer, more efficient way to transport animals in a vehicle. The pet is restrained in a seatlike apparatus which enhances the safety of the animal during its ride in the vehicle. With a proper means of being transported in the vehicle, the pet is more likely not to be left at home to cause unknown mischief during the owners absence and the driver can place more attention to driving and less on the activities of the animal. The apparatus is collapsible for easy storage and transportation.

A collapsible vehicle safety apparatus for animals, in combination with a vehicle, is described that has a rigid base and a collapsible support frame removably secured to the base. There are at least two blind insertion holes, in the base, to releasingly accept and retain a first leg and a second leg of the frame. A pliable barrier cover is attached to the frame. A padded top restraint means, is attached to the cover, to reduce trauma from impact due to abrupt forward movement of the animal. There is an adjustable harness, attached to the frame, to restrict movement of the animal. There is a first seat belt attachment means, in the cover, to attach a vehicular seat belt to secure the frame and cover to the vehicle. A second seat belt attachment means, is attached to the cover, to secure the frame and the cover to the vehicle. Either belt attachment means may be used at the discretion of the user. There is an insertion port in the cover and a removable soil tray slidingly inserted through the insertion port, over and in intimate contact with the base.

The frame may have a tubular back frame member, a tubular upper frame member pivotally connected to the back frame member, and a tubular angular frame member pivotally connected to the upper frame member. The angular frame member may be releasingly connected to the back frame member to support the upper frame member. The first seat belt means may have at least two belt ports in the cover. The second seat belt means may have at least two belt loops attached to the cover. The tubular back frame member may have at least one female receiving socket in a first leg and a second leg of the back frame member. The back frame member and the angular frame member support the upper frame member. The angular frame member may have a male socket, on one end of a first arm and on one end of a second arm of the angular frame member, that releasingly inserts into the receiving socket on the legs of the back frame member. This arrangement assists in the folding or collapsing of the apparatus.

It is an object of this invention to provide a collapsible vehicle safety apparatus to enhance the safe transportation of animals such as pets in vehicles such as cars, trucks and station wagons, for example.

It is another object of this invention to provide a vehicle safety apparatus for animals that allows the driver to secure the pet in such a manner that allows the pet a certain degree of freedom and comfort yet allows the driver to concentrate on driving without having to divert his or her attention from the road and traffic to the care and whereabouts of the animal.

It is yet another object of this invention to provide a vehicle safety apparatus for animals that collapses for easy storage and transportation.

DESCRIPTION OF THE PREFERRED EMBODIMENT

Figure 1:
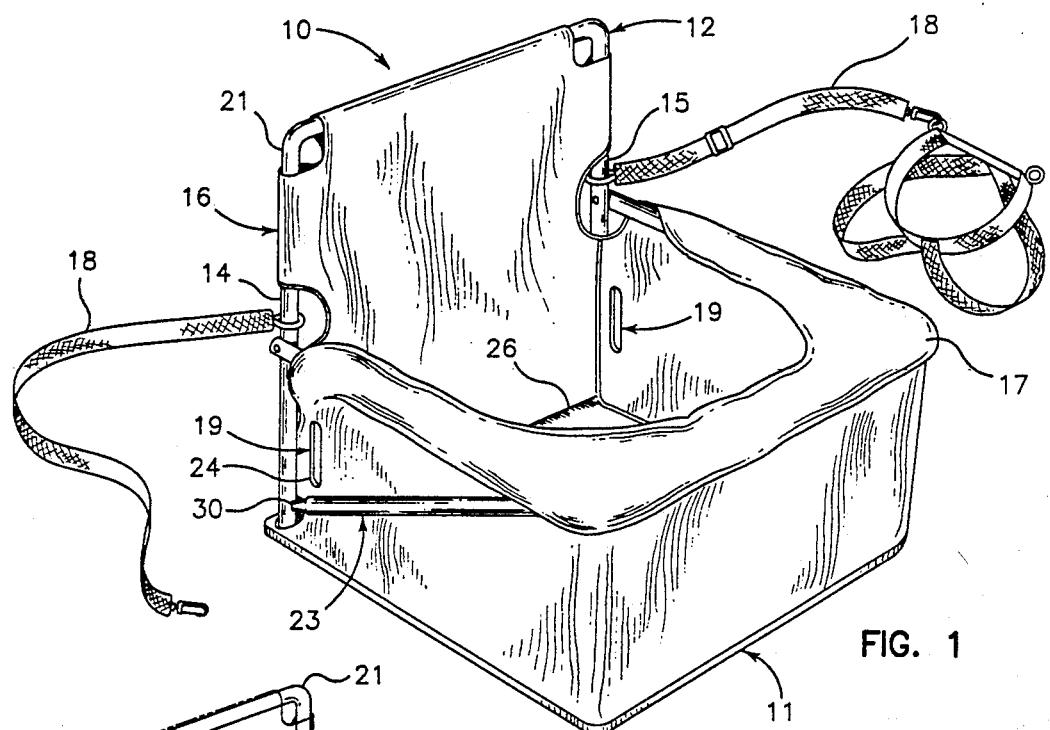
FIG. 1 is a perspective view of the Collapsible Vehicle Safety Apparatus for Animals displaying the restraining harness.
Figure 2:
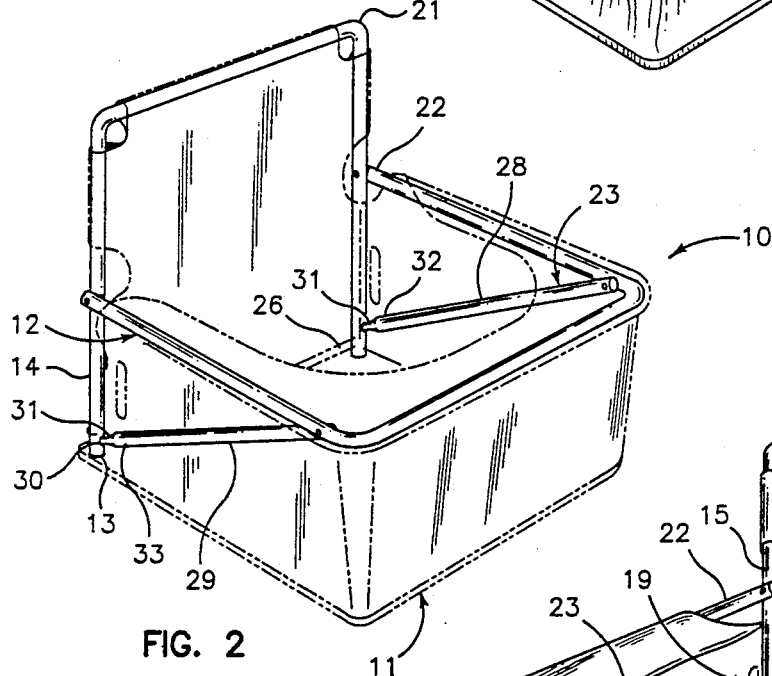
FIG. 2 is a perspective view of the apparatus with the fabric covering shown in phantom to show the support frame.
Figure 3:
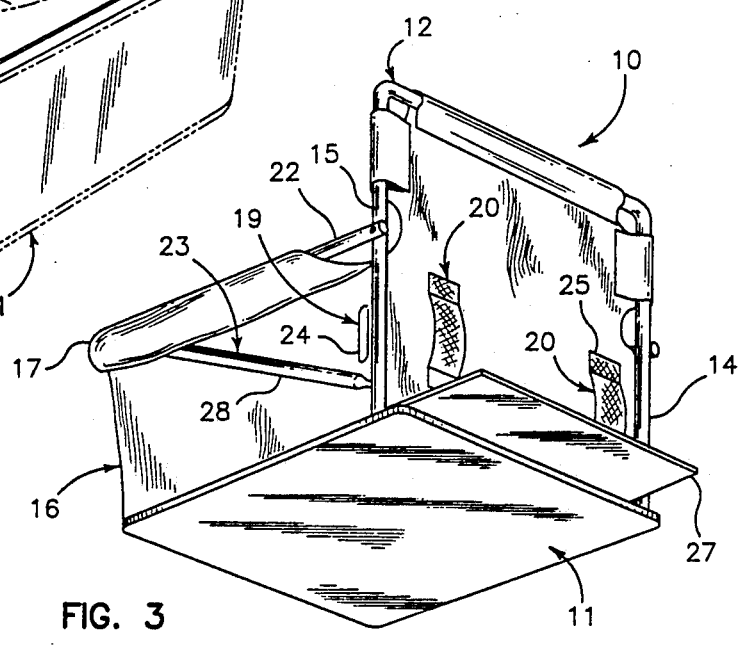
FIG. 3 is a bottom perspective view of the apparatus showing the removable soil tray partially withdrawn.

FIGS. 1 through 3 show the collapsible vehicle safety apparatus for animals 10.

A collapsible vehicle safety apparatus for animals 10, is described that has a rigid base 11 and a collapsible support frame 12 removably secured to the base 11. The frame 12 has a tubular back frame member 21, a tubular upper frame member 22 pivotally connected to the back frame member 21, and a tubular angular frame member 23 pivotally connected to the upper frame member 22. The angular frame member 23 is releasingly connected to the back frame member 21 to support the upper frame member 22. There are at least two blind insertion holes 13, in the base 11, to releasingly accept and retain a first leg 14 and a second leg 15 of the frame 21. A pliable barrier cover 16, such as a soil resistant fabric, is attached to the frame 12. A padded top restraint means 17, such as rolled resilient material, is attached to the cover 16, to reduce trauma from impact due to abrupt forward movement of the animal (not shown). There is an adjustable harness 18, attached to the frame 12, to restrict movement of the animal. There is a first seat belt attachment means 19, in the cover 16, to attach a vehicular seat belt (not shown) to secure the frame 12 and cover 16 to the vehicle. The first seat belt attachment means 19 has at least two belt ports 24 in the cover 16. This arrangement therefore secures the apparatus 10 and the animal to the vehicle (not shown). A second seat belt attachment means 20, is attached to the cover 16, to secure the frame 12 and the cover 16 to the vehicle. The second seat belt attachment means 20 has at least two belt loops 25 attached to the cover 16. Either belt attachment means may be used at the discretion of the user. There is an insertion port 26 in the cover 16 and a removable soil tray 27 slidingly inserted through the insertion port 26, over and in intimate contact with the base 11. The tubular back frame member 21 may have at least one female receiving socket 30 in a first leg 28 and a second leg 29 of the back frame member 21. The back frame member 21 and the angular frame member 23 support the upper frame member 22. The angular frame member 23 may have a male socket 31, on one end 32 of a first arm 28 and on one end 33 of a second arm 29 of the angular frame member 23, that releasingly inserts into the receiving socket 30 of the back frame member 21. This arrangement assists in the folding or collapsing of the apparatus 10. Removing the male sockets 31 on the ends 32 and 33 of the arms 28 and 29, respectively, of the angular frame member 23 from their receiving sockets 30 in the legs 14 and 15 of the back frame member 21 allows the arms of the angular frame member to swing out of the way and no longer support the upper frame member 22. The legs of the back frame member 21 are then removed from the insertion holes 13 in the base 11 and the members and the cover 16 may be folded down towards the base 11.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A collapsible vehicle safety apparatus for animals comprising:
   a. a rigid base;
   b. a collapsible support frame removably secured to the base;
   c. at least two blind insertion holes, in the base, to releasingly accept and retain a first leg and a second leg of the frame;
   d. a pliable barrier cover attached to the frame;
   e. a padded top restraint means, attached to the cover, to reduce trauma from impact due to abrupt forward movement;
   f. an adjustable harness, attached to the frame, to restrict movement of the animal;
   g. a first seat belt attachment means, in the cover, to attach a vehicular seat belt to secure the frame and cover to the vehicle;
   h. a second seat belt attachment means, attached to the cover, to secure the frame and the cover to the vehicle;
   i. an insertion port in the cover; and
   j. a removable soil tray slidingly inserted through the port, over and in intimate contact with the base.

2. A collapsible vehicle safety apparatus for animals as described in claim 1 wherein the frame comprises:
   a. a tubular back frame member;
   b. a tubular upper frame member pivotally connected to the back frame member; and
   c. a tubular angular frame member pivotally connected to the upper frame member and releasingly connected to the back frame member to support the upper frame member.

3. A collapsible vehicle safety apparatus for animals as described in claim 1 wherein the first seat belt means comprises at least two belt ports in the cover.

4. A collapsible vehicle safety apparatus for animals as described in claim 1 wherein the second seat belt means comprises at least two belt loops attached to the cover.

5. A collapsible vehicle safety apparatus for animals comprising:
   a. a rigid base;
   b. a collapsible support frame removably secured to the base comprising:
      a tubular back frame member having at least one female receiving socket in a first leg and a second leg of the back frame member;
      a tubular upper frame member pivotally connected to the back frame member; and
      a tubular angular frame member pivotally connected to the upper frame member and releasingly connected to the back frame member to support the upper frame member, and having a male socket, on one end of a first arm and a second arm of the angular frame member, that releasingly inserts into the receiving socket of the back frame member;
   c. at least two blind insertion holes, in the base, to releasingly accept and retain a first leg and a second leg of the frame;
   d. a pliable barrier cover attached to the frame;
   e. a padded top restraint means, attached to the cover, to reduce trauma from impact due to abrupt forward movement;
   f. an adjustable harness, attached to the frame, to restrict movement of the animal;
   g. a first seat belt attachment means, in the cover, to attach a vehicular seat belt to secure the frame and cover to the vehicle comprising at least two belt ports in the cover;
   h. a second seat belt attachment means, attached to the cover, to secure the frame and the cover to the vehicle comprising at least two belt loops attached to the cover;
   i. an insertion port in the cover; and
   j. a removable soil tray slidingly inserted through the port, over and in intimate contact with the base.

* * * * *